Oct. 9, 1956  F. GEORGE  2,766,122
METHOD OF PREPARING A FOOD PRODUCT
Filed April 7, 1951  2 Sheets-Sheet 2
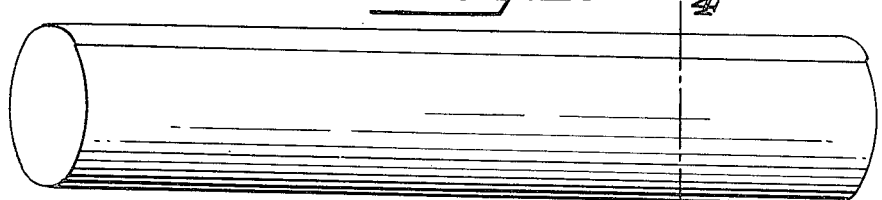
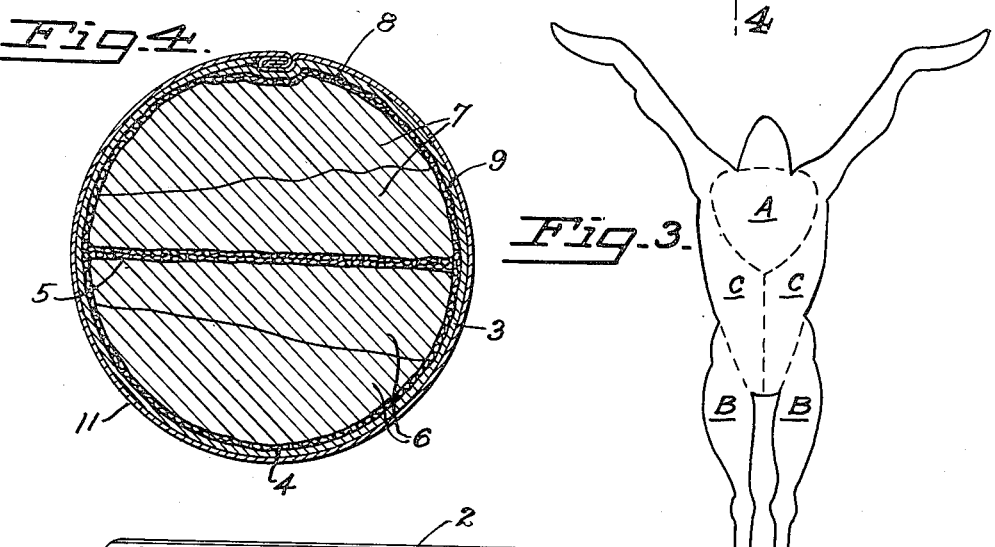
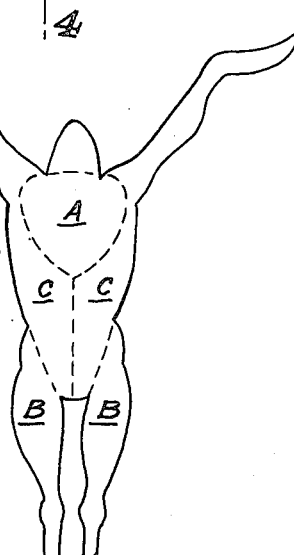
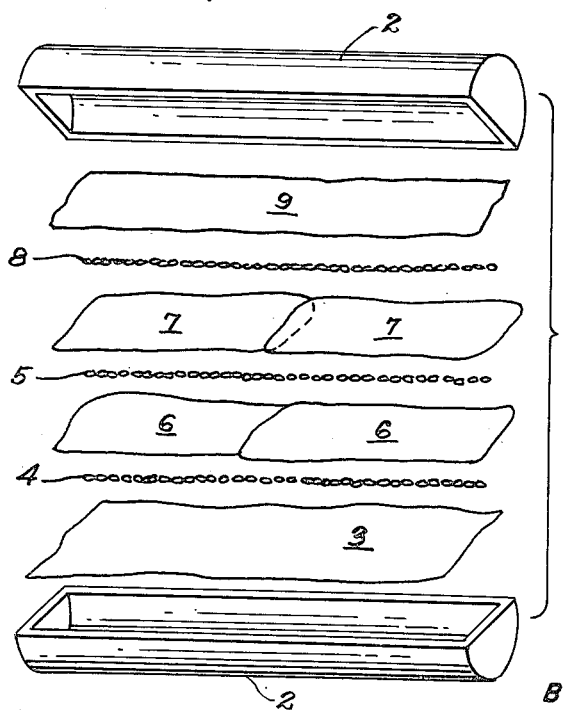
INVENTOR
FRED GEORGE
BY
Townsend and Townsend
ATTORNEYS United States Patent Office 2,766,122
Patented Oct. 9, 1956

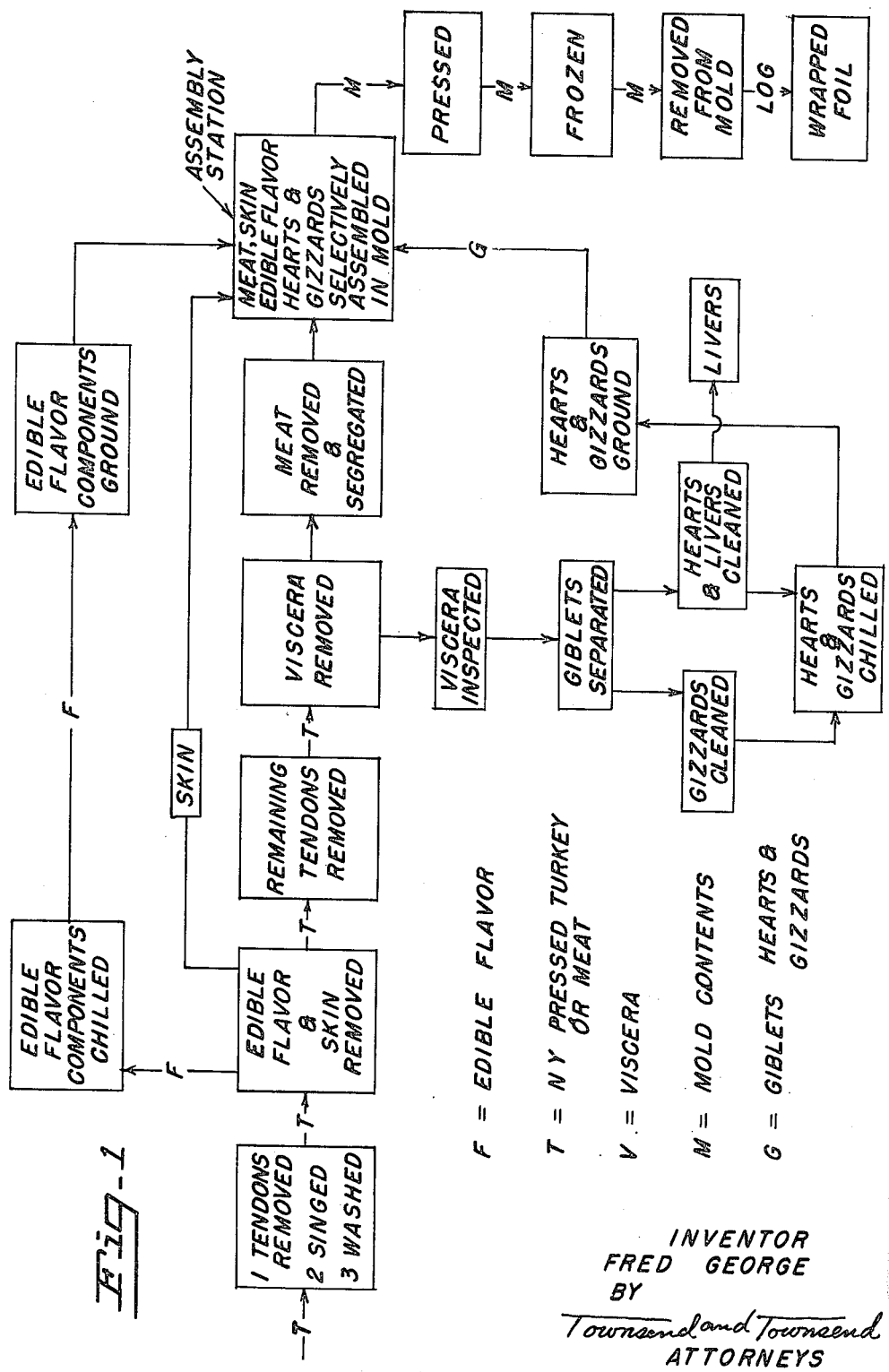

2,766,122

METHOD OF PREPARING A FOOD PRODUCT

Fred George, Berkeley, Calif., assignor of one-half to Norbest Turkey Growers Association, Salt Lake City, Utah Application April 7, 1951, Serial No. 219,845

1 Claim. (Cl. 99—107)

This invention relates to food products and methods of preparing the same, and more specifically relates to improvements in meat products comprised of frozen turkey meat and a method of preparing the same.

This invention is in the nature of a continuation in part of my copending application for Food Product and Method of Preparing Same, Serial No. 136,544, filed January 3, 1950, now United States Patent No. 2,640,779.

An object of the present invention is to provide a method of preparing a log formed of raw, boned turkey meat and adapted to be hard frozen.

A more specific object of the present invention is to provide a method of preparing a turkey meat product of the character mentioned, which may be produced economically in large volume and wherein the end product is characterized as having traditional whole turkey flavor.

One of the more specific objects of the invention is to provide a method of preparing a turkey product of the character mentioned from New York dressed birds as distinguished from eviscerated birds. It is economically advantageous to utilize New York dressed birds in preparing the food product rather than eviscerated birds as contemplated in my copending application Serial No. 136,544, now United States Patent No. 2,640,779.

The present invention contemplates the removal of component parts of a New York dressed turkey and assembly of said edible component parts to form a log of turkey meat, and which said meat is reconstituted with the natural flavor, texture and proportioned parts of the bird in a form suitable for mass scale production and distribution.

Other advantages and objects of the invention will become apparent upon reference to the specification and accompanying drawings, in which similar characters of reference represent corresponding parts in each of the several views.

Referring to the drawings:

Fig. 1 represents a flow sheet illustration, indicating the various steps in the production of a turkey log or loaf for the commercial market.

Fig. 2 is a perspective view of a wrapped log.

Fig. 3 is a diagrammatic view of a turkey, illustrating the dark and white meat parts B and C, respectively, of the bird which are cut from the carcass to form the log or loaf and indicating the area in which the edible flavor of the bird is located at A.

Fig. 4 is a sectional view of a turkey log.

Fig. 5 is an exploded perspective view of the mold and turkey log components.

As fully set forth in my copending application Serial No. 136,544, now United States Patent No. 2,640,779, the essence of the product invention resides in the preparation of a log or loaf of turkey meat and in which is contained the essential and characteristic natural edible flavor of the whole turkey. The log of turkey meat contains a uniform controlled amount of that portion of the turkey which controls the desirable and characteristic whole turkey flavor. The portion of the bird referred to is that triangular area, indicated generally at A in Fig. 4 and constituting the crop and anterior medial portion of the pectoral muscles and consisting of the skin, fatty tissue and flavor glands contained within this area.

In this specification and claim the subject area and/or components of the area are referred to as the "edible flavor," and which expression shall be deemed to include all of the subject area, or the flavor glands alone, or together with one or the other of the components.

The method of preparing the turkey product comprises the use of New York dressed turkeys which are handled in line production as rapidly as possible to avoid flavor loss occasioned by temperature change during the production of the end product.

The steps of the method of preparing the food product will now be described, and reference is made to Fig. 1, which illustrates by flow sheet representation the stations or steps included in the preferred process.

The New York dressed birds are moved into the production room suspended from overhead traveling conveyors of conventional design. The birds are suspended from the conveyors by their wings so that the neck is up and the legs are down.

First, the bird is singed and washed and the large tendons are removed; then the bird is moved to a second station where the edible flavor section and carcass skin are removed; and then the carcass travels to a third station and the remaining tendons are removed. In the meantime, the carcass skin and edible flavor are separated and the skin is directed to the assembly station. The edible flavor components are chilled and ground and then directed to the assembly station. The edible flavor components are chilled in order to facilitate grinding.

After the tendons have been removed, the bird travels to the next station and the viscera is removed. Then the eviscerated carcass moves to the next station and the meat is stripped from the carcass and the dark and light meat segregated. After evisceration and before the meat is stripped the viscera is inspected by appropriate tests to be certain of the quality of meat. Assuming the bird is healthy and passes inspection, the viscera is segregated and after the components thereof are cleaned the hearts and gizzards are chilled and then ground and taken to the assembly station. The livers are employed in products other than a turkey log. After the dark and white meat have been stripped from the carcass and segregated they are transported to the assembly station and the log is then formed.

The component parts of the log are placed in a two-section, cylindrical mold 2 in the following preferred order: First, a layer of skin 3 is placed in one half of the mold and over which is spread uniformly ground edible flavor 4; then layers of dark and white meat 6 and 7 are added over the skin and edible flavor and additional edible flavor 8 is added uniformly around layer 7 and a final wrapping of skin 9 is disposed over the top of the assembled parts. Thus the edible flavor is disposed between the meat and skin from end to end and circumferentially of the log. If desired, ground heart and gizzard 5 are disposed uniformly between the layers of meat 6 and 7 substantially from end to end and side to side thereof. The mold parts 2 are then closed and subjected to pressure in the order of one thousand to two thousand pounds per square inch to eliminate all air pockets and to compress the parts into a cohesive mass.

The closed mold, locked under pressure, is then subjected to freezing temperatures and the log is hard frozen. Thereafter, the log is removed and wrapped preferably in metal foil 11. Preferably the log is kept in a hard frozen condition until readied for cooking. Two layers of white or dark meat may be substituted for the combination of dark and white meat layers and the ground heart and gizzard may be eliminated, if desired.

Assuming a log to total one hundred thirty-nine ounces, the following is a preferable breakdown by weight of the ingredients:

| | Ounces |
|---|---|
| Skin | 16. |
| Edible flavor | 4 |
| White meat | 71.40 |
| Dark meat | 47.60 |

When it is desired to add ground heart and gizzard to the log, the dark meat is reduced 4 ozs. while 4 ozs. of the ground heart and gizzard are introduced.

The essence of the present invention, as an improvement over my said copending application Serial No. 136,544 now United States Patent No. 2,640,779, resides in the use of New York dressed birds. For the first time a New York dressed bird is processed in line production efficiency to an end package product and in which process the evisceration step is included at a point after removal of a portion of the bird components and prior to removal of other of said components. The economy of inclusion of the eviscerating step in the line production processing of the birds is a very substantial improvement over known procedures and enables utilization of marketable birds at greatly reduced costs per pound of meat processed. Economy is not only found in the cost of New York dressed birds over eviscerated birds but also in the quick handling of the turkeys and components thereof from storage to end product.

Again, the placement of the edible flavor between the skin wrapping and meat layers is preferred and serves not only to reconstitute the natural characteristic flavor of whole turkey but also tends to cause cohesion of the component parts of the log thus to produce a more cohesive product than heretofore.

I claim:

A method of preparing a food product, comprising the steps followed in sequential order of separating from an uneviscerated turkey the edible flavor thereof, then removing the skin therefrom, then removing the tendons from said uneviscerated turkey, then eviscerating the turkey, and then separating the meat from the eviscerated turkey, assembling the meat in a desired form and adding the edible flavor thereto, wrapping the meat and edible flavor in said skin, and then processing said wrapped meat and edible flavor to preserve the same.

References Cited in the file of this patent

UNITED STATES PATENTS

| 2,267,442 | Clark | Dec. 23, 1941 |
| 2,633,601 | Snyder | Apr. 7, 1953 |
| 2,640,779 | George | June 2, 1953 |

OTHER REFERENCES

"The U. S. Egg and Poultry Magazine," January 1950, pages 9, 10, and 24, article entitled "Turkey Logs."